(12) United States Patent
Li et al.

(10) Patent No.: US 8,708,858 B2
(45) Date of Patent: Apr. 29, 2014

(54) ELECTRIC GENERATOR UNIT

(76) Inventors: Wenxiu Li, Beijing (CN); Zhenquan Wang, Tieling (CN)

( * ) Notice: Subject to any disclaimer, the term of this patent is extended or adjusted under 35 U.S.C. 154(b) by 264 days.

(21) Appl. No.: 13/256,204

(22) PCT Filed: Mar. 12, 2010

(86) PCT No.: PCT/CN2010/000304
§ 371 (c)(1),
(2), (4) Date: Sep. 12, 2011

(87) PCT Pub. No.: WO2010/102520
PCT Pub. Date: Sep. 16, 2010

(65) Prior Publication Data
US 2012/0004065 A1     Jan. 5, 2012

(30) Foreign Application Priority Data

Mar. 12, 2009  (CN) .......................... 2009 1 0079469

(51) Int. Cl.
*F16H 33/08*      (2006.01)
(52) U.S. Cl.
USPC .............................. 475/267; 475/160; 475/330
(58) Field of Classification Search
CPC ........... F16H 3/62; F16H 33/02; F16H 33/08; F16H 33/14; F16H 57/0482; F16H 57/08

USPC .................. 475/159, 160, 162, 163, 267, 330
See application file for complete search history.

(56) References Cited

U.S. PATENT DOCUMENTS

| | | | | |
|---|---|---|---|---|
| 2,881,642 A | * | 4/1959 | Dodge | .......................... 475/255 |
| 3,448,828 A | * | 6/1969 | Goldberg | .......................... 184/6 |
| 4,169,519 A | * | 10/1979 | Hirt et al. | ...................... 184/6.3 |
| 5,911,793 A | * | 6/1999 | Kaye | ........................... 74/606 R |
| 7,481,732 B2 | | 1/2009 | Hwang et al. | |
| 7,674,200 B2 | * | 3/2010 | Shim | ............................ 475/281 |
| 2007/0093341 A1 | | 4/2007 | Supina et al. | |

FOREIGN PATENT DOCUMENTS

| | | |
|---|---|---|
| CN | 201106525 Y | 8/2008 |
| CN | 201129406 Y | 10/2008 |
| CN | 201166093 Y | 12/2008 |

\* cited by examiner

*Primary Examiner* — Justin Holmes
(74) *Attorney, Agent, or Firm* — Suiter Swantz pc llo

(57) ABSTRACT

An electric generator unit comprises a front flywheel, a back flywheel, a gear accelerating assembly, a planetary decelerating assembly, a middle shaft and a tail shaft. The electric generator unit forms the effect of energy increasing by degrees based on the nonlinear coupling theory and the assembly of mass, acceleration and lever. When a small driving force is continuously given from the outside, the electric generator unit can achieve energy increasing by degrees.

6 Claims, 8 Drawing Sheets

ELECTRIC GENERATOR UNIT

TECHNICAL FIELD

The present invention relates to the field of power generation devices and particularly to an electric generator unit.

BACKGROUND

Modern human is dependent on various fuels (coal, oil, gas, etc). Because the population and the scale of production growth and expansion, the fuel consumption is expanding rapidly (most of the fuel comes from non-renewable resources) while the resources dwindles. At the same time, with the serious pollution caused by the harmful gases produced by burning fuel and further enhancement of the greenhouse effect, the human survival is threatened seriously. If all industries consuming fuel are using electricity, it may create a green ecological environment.

However, wind power, solar power and nuclear power all have the following disadvantage: high building cost and long building period; especially for the daily living electricity in remote mountainous areas, it is necessary to build remote transmission power system.

SUMMARY

The present invention is directed to an electric generator unit. The electric generator unit forms the effect of energy increasing by degrees based on the nonlinear coupling theory and the assembly of mass, acceleration and lever. When a small driving force is continuously given from the outside, the electric generator unit can achieve energy increasing by degrees.

Accordingly, an object of this invention is to provide an electric generator unit which comprises a front flywheel, a back flywheel, a gear accelerating assembly, a planetary decelerating assembly, a middle shaft and a tail shaft.

The front flywheel along with a shaft sleeve is mounted on the middle position of the tail shaft. The tail shaft is coaxial with the middle shaft. The distal end of tail shaft is coupled with a front end of the middle shaft by a gear accelerating assembly. The gear accelerating assembly comprises a first planetary disc and a second planetary disc. A sun gear of the first planetary disc along with a shaft sleeve is mounted on a distal end of the tail shaft, and a sun gear of the second planetary disc along with a shaft sleeve is mounted on a front end of the middle shaft. The two planetary gears corresponding to each planetary disc are mutually coupled by a gear shaft.

The back flywheel and the planetary decelerating assembly along with a shaft sleeve is mounted on the middle shaft. A planetary decelerating assembly includes a third planetary disc and a turntable disc. A sun gear of the third planetary is eccentric and mounted on middle shaft along with a shaft sleeve, and turntable disc which has a single-row angular contact ball bearing corresponding to the position of planetary gear of the third planetary disc is mounted on a distal end of the middle shaft. The single-row angular contact ball bearing is coupled with the planetary gear of the third planetary disc by gear shaft.

When a small driving force is continuously given to the electric generator unit from the outside. The front flywheel and a sun gear of the first planetary disc in gear accelerating assembly are driven by the tail shaft. The sun gear promotes the planetary gear of the first planetary disc around, the planetary gear moves around the sun gear inward and around inner gear ring outward, so all the central shafts of planetary gear together push the first planetary disc around. At the same time, each planetary gear of the first planetary disc through gear shaft revolves each planetary gear of the second planetary disc, then each planetary gear of the second planetary disc pushes the second planetary disc and the sun gear rotated, the sun gear revolves the middle shaft, then the middle shaft drives the back flywheel mounted on this middle shaft and the sun gear of the second planetary disc of planetary decelerating assembly to revolve, and the planetary gear of the third planetary disc is revolved by the sun gear so as to push the third planetary disc rotated. At the same time, each planetary gear of the third planetary disc through gear shaft pushes the single-row angular contact ball bearing in turntable disc rotated, then the single-row angular contact ball bearing drives the turntable disc to go round. When the whole electric generator unit runs steadily, wherein the front flywheel, back flywheel, planetary discs and turntable disc forms the effect of energy increasing by degrees based on the nonlinear coupling theory and the assembly of mass, acceleration and lever. The middle shaft is coupled with the shaft generator. The electric generator unit can achieve generating electricity.

The present invention provides another electric generator unit, wherein the first or second planetary disc respectively has four planetary gears, and the third planetary disc has eight planetary gears.

The present invention further provides another electric generator unit includes a shell. An end of the shell along with shaft sleeve is mounted on a distal end of the middle shaft and another end of the shell along with shaft sleeve is mounted on a front end of the tail shaft. A front flywheel, a back flywheel, a gear accelerating assembly and a planetary decelerating assembly are mounted inside the shell.

The present invention still provides another electric generator unit, wherein a shell is provided with an oil inlet nozzle and an oil return nozzle which are fluidly connected to oil tank respectively through inlet line and outlet line. The interior of shell keep sealed from the outside.

The present invention yet provides another electric generator unit includes a chassis assembly for securing the electric generator unit. The chassis assembly includes two laterally arranged upright chassis beams and a small beam, and each end of the small beam is fixed on a chassis beam. The electric generator unit is mounted on the chassis assembly.

The present invention still provides another electric generator unit, wherein the chassis beams adopts seamless steel tubes. An end of the seamless steel tube is sealed, and another end is fluidly connected to oil tank. The tube wall of seamless steel tube is provided with openings, each of which is respectively connected with the inlet nozzle and the oil return nozzle. The seamless steel tubes can be used as an outer-circulation oil circuit.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the subject matter disclosed, which is illustrated in the accompanying drawings.

Figure 1:
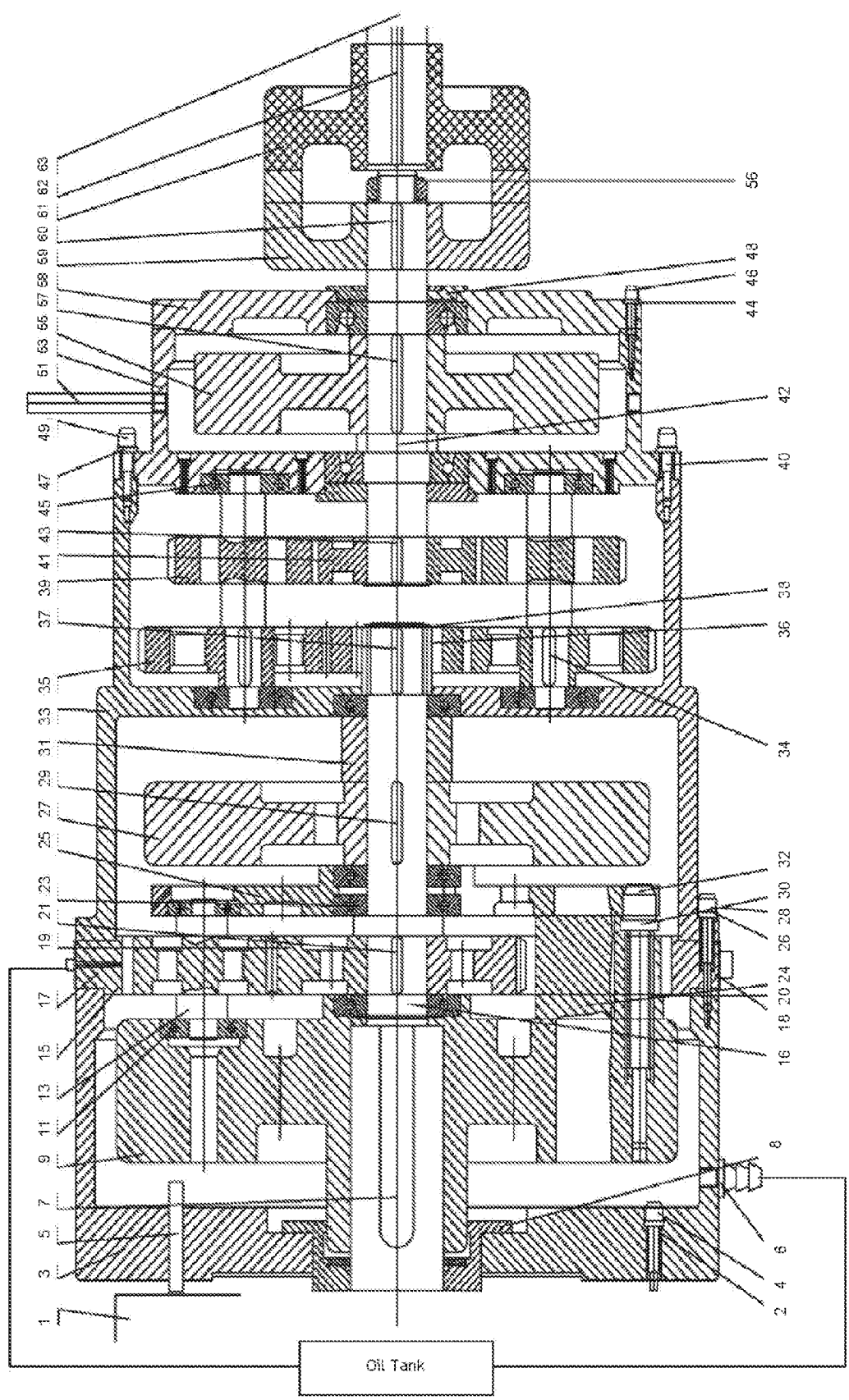
FIG. 1 is a sectional view of an electric generator unit according to the present invention.
Figure 2:
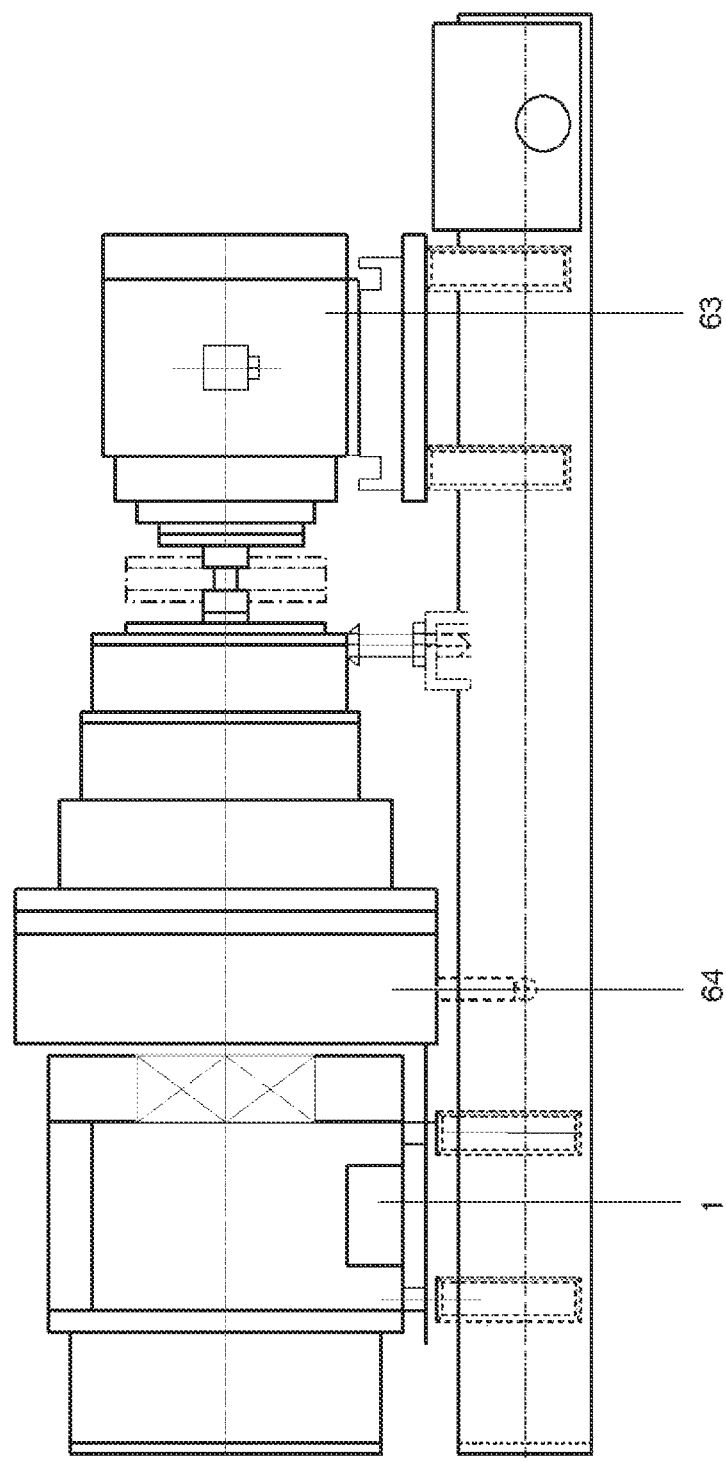
FIG. 2 is a view illustrating an electric generator unit, and electric motor connected in series of the present invention.

Referring now to FIG. 1, An electric generator unit which comprises a front flywheel 55, a back flywheel 27, a gear accelerating assembly, a planetary decelerating assembly, a middle shaft 16, a tail shaft 42, a chassis assembly, a shell, a 55 kw two-lever generator and a 120 kw electric motor. Referring to FIG. 2, the generator, electric generator unit and motor are coaxial with each other.

The front flywheel 55 along with a shaft sleeve is mounted on the middle position of a tail shaft 42. The tail shaft 42 is coaxial with the middle shaft 16. The distal end of tail shaft 42 is coupled with a front end of the middle shaft 16 by a gear accelerating assembly. The gear accelerating assembly comprises a first planetary disc and a second planetary disc. A sun gear of the first planetary disc along with a shaft sleeve is mounted on a distal end of the tail shaft 42, and a sun gear of the second planetary disc along with shaft sleeve is mounted on a front end of the middle shaft 16. The two planetary gears corresponding to each planetary disc are mutually coupled by a gear shaft 13.

The back flywheel 27 and the planetary decelerating assembly along with a shaft sleeve are mounted on the middle shaft 16. A planetary decelerating assembly includes a third planetary disc and a turntable disc 9 which is mounted on middle shaft along with a shaft sleeve, and turntable disc 9 which has a single-row angular contact ball bearing corresponding to the position of planetary gear of the third planetary disc is mounted on a distal end of the middle shaft 16. The single-row angular contact ball bearing is coupled with the planetary gear of the third planetary disc by gear shaft. The first or second planetary disc respectively has four planetary gears, and the third planetary disc has eight planetary gears.

Figure 3:
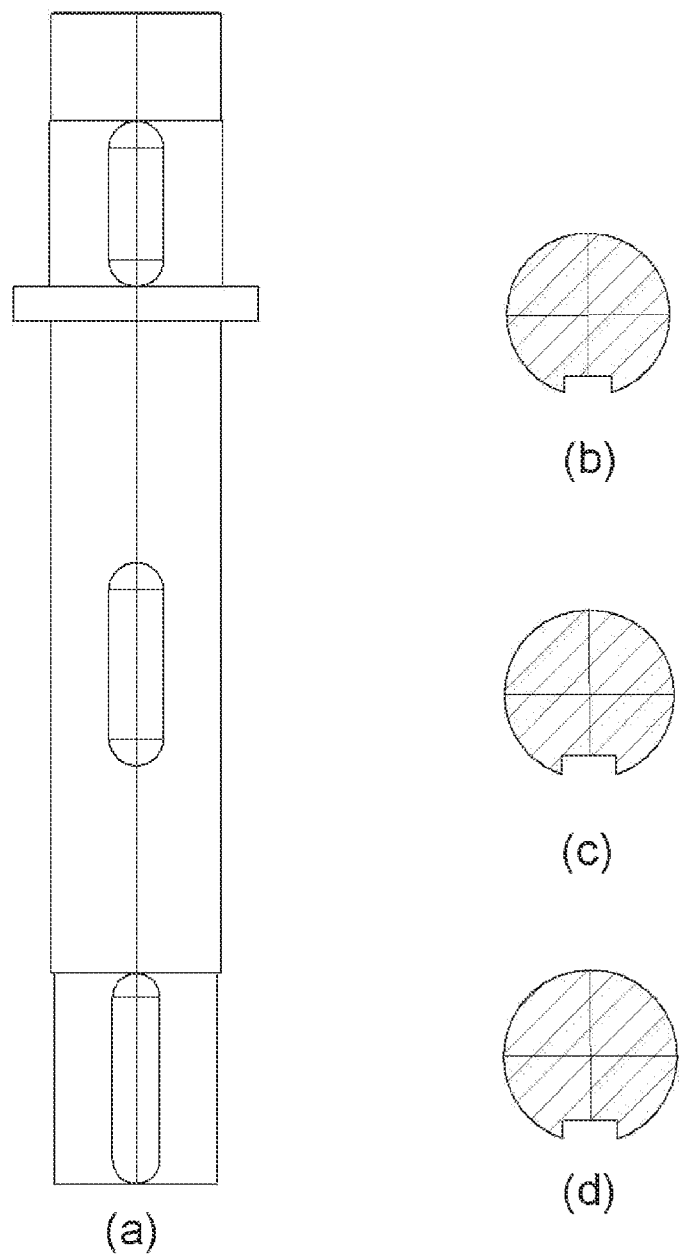
FIG. 3a-d is a structural view of the middle shaft of an electric generator unit according to the present invention.
Figure 4:
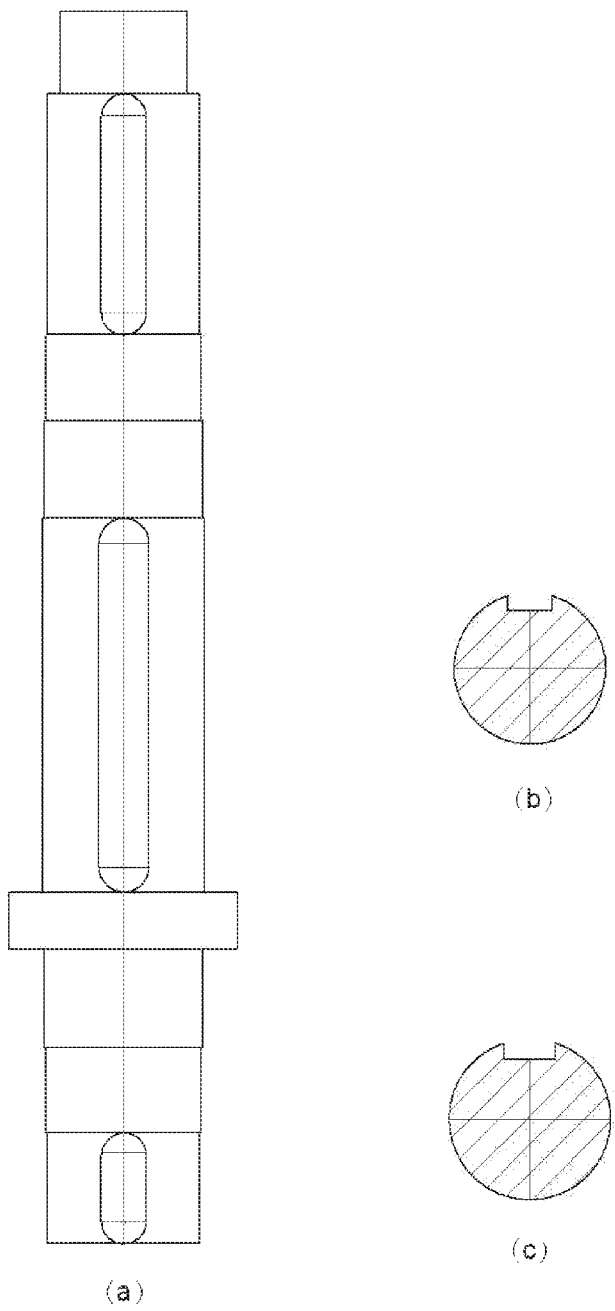
FIG. 4a-c is a structural view of the tail shaft of an electric generator unit according to the present invention.

Referring to FIG. 3, a single round-nosed key 7 is mounted in distal end of the middle shaft, besides the middle shaft has three double round-nosed keys. Referring to FIG. 4, the tail shaft also has three double round-nosed keys.

The front flywheel 55 weights 87 kg, the back flywheel 27 weights 83 kg and the turntable disc 9 weights 249 kg.

An end of the shell along with shaft sleeve is mounted on the distal end of the middle shaft 16 and another end along with a shaft sleeve is mounted on a front end of the tail shaft 42. A front flywheel 55, a back flywheel 27, a gear accelerating assembly and a planetary decelerating assembly are mounted inside the shell. All junctions of the shell, middle shaft and tail shaft are sealed by the shield oil ring assemblies. The shell includes a small end cover 58, a box cover 53, a housing box 33 and a big housing 3.

Figure 5:
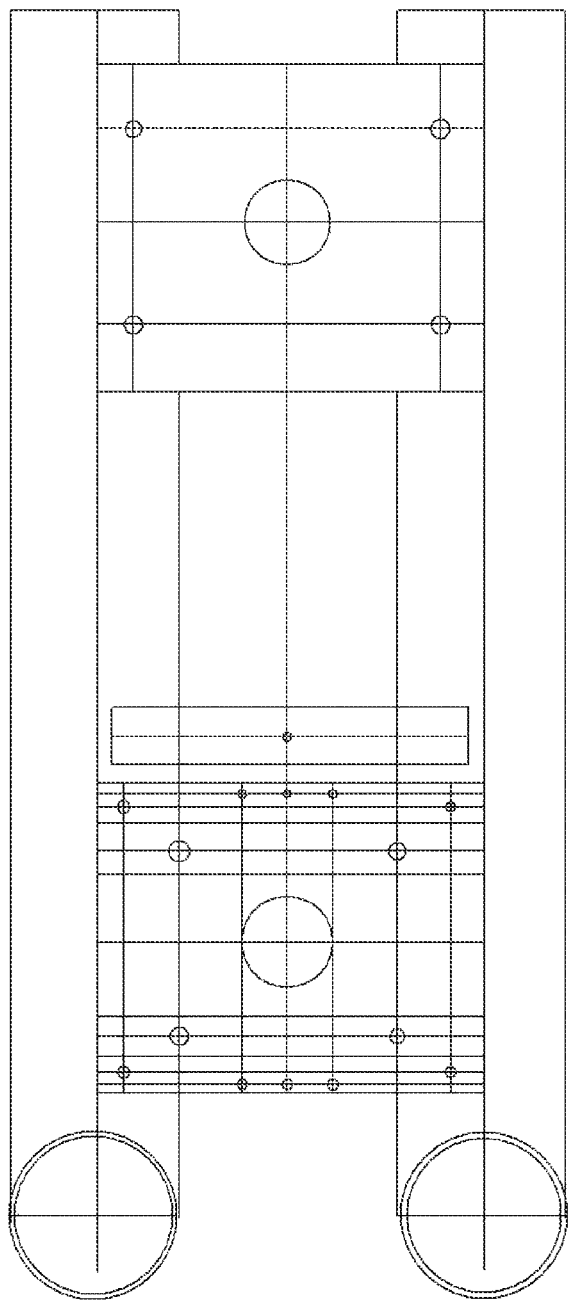
FIG. 5 is a top view of the chassis assembly of an electric generator unit according to the present invention.
Figure 6:
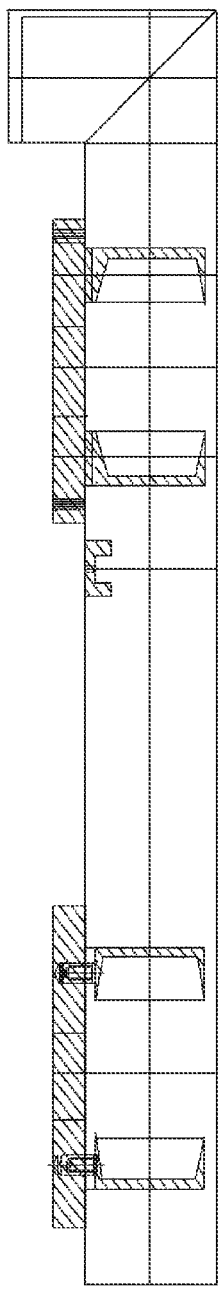
FIG. 6 is a side view of the chassis assembly of an electric generator unit according to the present invention.

Referring to FIGS. 5 and 6, the chassis assembly includes two laterally arranged upright chassis beams, a small beam, four beams, an upper drop panel of electric motor, a lower drop panel of electric motor and a drop panel of generator. Each end of the small beam and four beams is fixed on the two upright chassis beams. The lower drop panel of motor is fixed on the two beams, and the lower drop panel of motor is fixed on the drop panel of generator. The electric motor is mounted on the upper drop panel of electric motor, the drop panel of generator is fixed on the other two small beams, and the generator is fixed on the drop panel of generator.

The shell is provided with an oil inlet nozzle and an oil return nozzle. The chassis beams adopt seamless steel tubes, an end of the seamless steel tube is sealed, and another end is fluidly connected to oil tank. The tube wall of seamless steel tube is provided with openings, each of which is respectively connected with the inlet nozzle and the oil return nozzle. The gear lubricant can flow along the circulation line within the whole unit.

Figure 7:
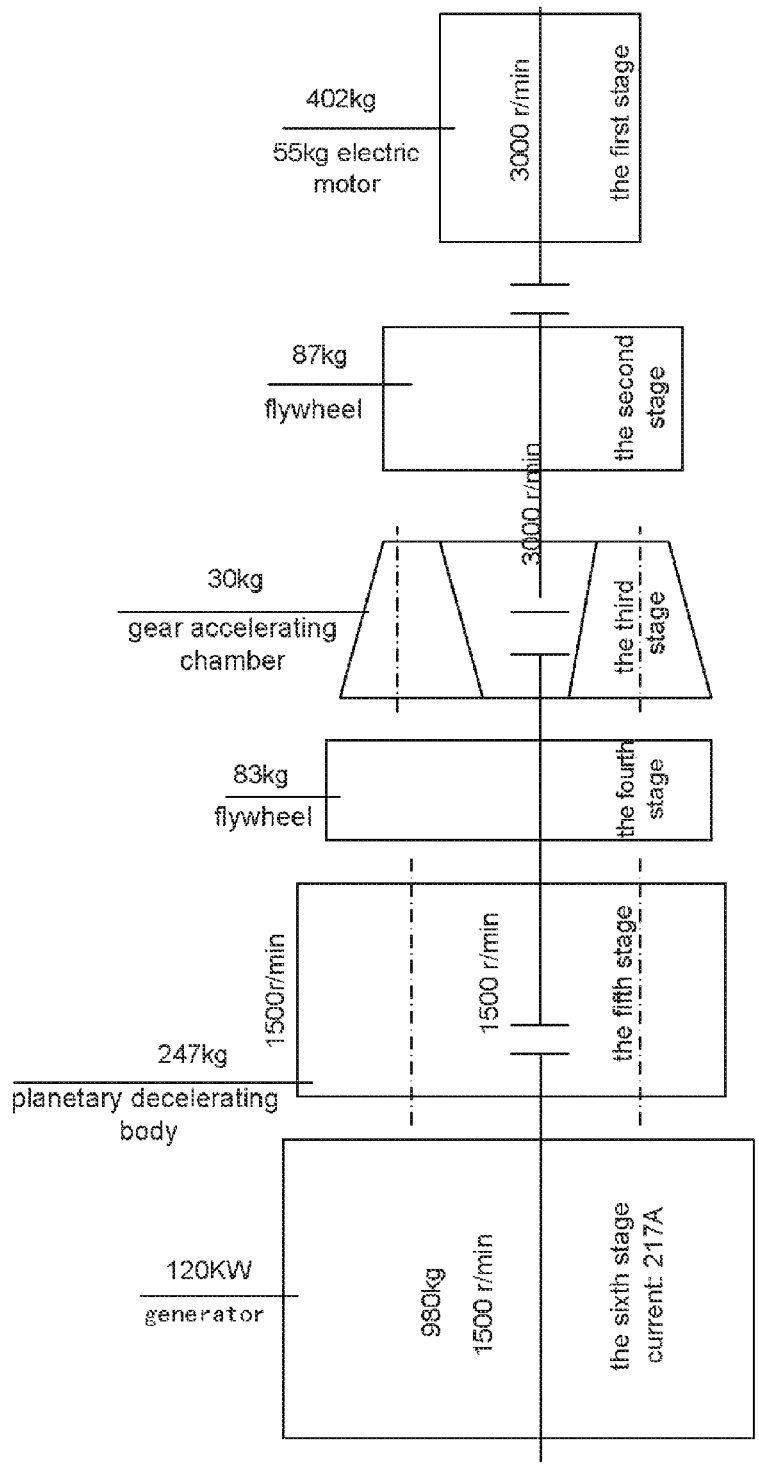
FIG. 7 is a structure sketch of an electric generator unit according to the present invention.

The transmission system of the electric generator unit is sorted and connected in a tandem manner as shown in FIG. 7.

The electric generator unit is connected with the motor by joining the clutch, and the distal end of middle shaft of electric generator unit is coupling with the main shaft of the generator.

Figure 8:
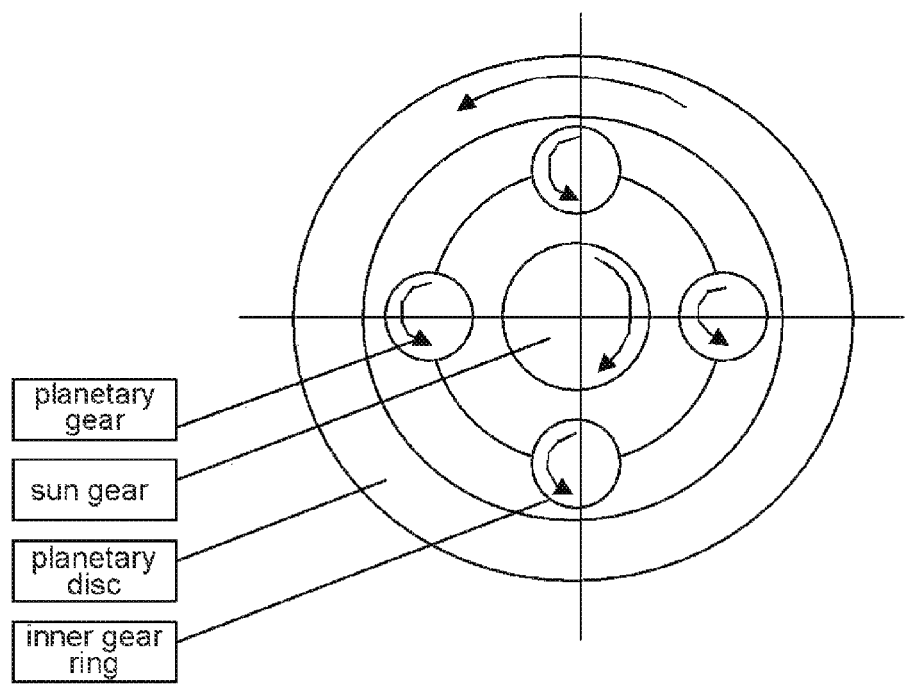
FIG. 8 is a structure sketch of planetary system in the existing technology.

The process of operation of the unit are as follows: a planetary system composed of the internal gears and external gears has a sun gear in the center which pushes the four planetary gears running, then the central shafts of the four planetary gears turn the planetary disc. The planetary gear moves around the sun gear inward and around the inner geared ring outward, so all the central shafts of the planetary gear together push the first planetary disc around and increase the speed of inertia assembly. The schematic of planetary system is shown as FIG. 8.

The electric motor of the first stage starts the generator unit at 3000 r/min, and this speed is transmitted to the middle shaft of flywheel at the second stage, when the middle shaft keeps running at 3000 r/min, this speed is transmitted to the middle shaft of the gear set of accelerating chamber at the third stage again, after increasing the speed to 5000 r/min through the gear set of the accelerating chamber, this speed is transmitted to and keeps the middle shaft of flywheel at the fourth stage running at 5000 r/min, then this speed is transmitted to and keeps the middle shaft of flywheel at the fourth stage, as well as the middle shaft of sun gear of the planetary system (being coaxial with flywheel) running at 5000 r/min. At the same time, this speed is transmitted to the planetary system at the fifth stage, after reducing the speed to 1500 r/min through the planetary system, this speed is synchronized to the generator and is transmitted to the main shaft of the generator at the sixth stage so as to make electricity.

After starting the generator unit at rated speed of the two-level electric motor, the rated speed of electric motor is transmitted to the first planetary system of the generator unit, and the output speed are slowed down more than three times, this low speed is increased by three times again through the accelerating chamber, further again this increased speed is decreased by more than three times through the third planetary system. After the rated speed of generator unit is circularly increased three times and circularly decreased three times through the three planetary systems transmission, the speed is transmitted to the generator at the sixth stage so as to make electricity.

The rated speed 3000 r/min of the 55 kw two-lever generator is transmitted to the central mounted shaft of the "front flywheel" which weighs 87 kg and is located at the second stage. The speed of "front flywheel" keeps the generator running at the rated speed (3000 r/min). An input gear is mounted on another end of the mounted shaft of "front flywheel", and the input gear keeps up the speed 3000 r/min of the flywheel at the first stage, the inertia force of the input gear is also consistent with "front flywheel". Both the speed and inertia force are transmitted to the gear accelerating chamber. The speed is increased to 5000 r/min from 3000 r/min by the gear accelerating chamber. The speed 5000 r/min is transmitted to and keeps the mounted shaft of the back flywheel at the fourth stage running at 5000 r/min, and the inertia of the back flywheel at the fourth stage is increased. A flywheel assembly is mounted on an end of the back flywheel at the fourth stage, and a sun gear of the planetary system is mounted on another end. The back flywheel at the fourth stage with mass of 83 kg and the speed of 5000 r/min pushes the sun gear of the planetary system running. The planetary system is commonly considered a decelerating assembly, and the output inertia wheel disc of the planetary system that weighs 247 kg is mounted on the spindle of generator. After decreased to 1500 r/min from 5000 r/min by the planetary system, this speed is synchronized to the generator, the resultant force composed of the inertial force, lever force and coupling force drive the generator so as to make electricity.

The electric generator unit can reduce pollution to the environment more efficiently, which is not only a unit of environmental protection and energy saving necessity but also has the advantages of simple structure, safe and reliable performance, and stable output voltage and frequency.

What is claimed is:

1. An electric generator unit, comprising:
a front flywheel (55), a back flywheel (27), a gear accelerating assembly, a planetary decelerating assembly, a middle shaft (16) and a tail shaft (42);
the front flywheel (55) along with a shaft sleeve is mounted on the middle position of the tail shaft (42), the tail shaft (42) is coaxial with the middle shaft (16), a distal end of tail shaft (42) is coupled with a front end of the middle shaft (16) by the gear accelerating assembly, the gear accelerating assembly comprises a first planetary disc and a second planetary disc; a sun gear of the first planetary disc along with a shaft sleeve is mounted on the distal end of the tail shaft (42), and a sun gear of the second planetary disc along with a shaft sleeve is mounted on a front end of the middle shaft (16); each of the first and second planetary discs of the gear accelerating assembly further includes a planetary gear, and the two planetary gears corresponding to the first and second planetary discs are mutually coupled by a gear shaft;
the back flywheel (27) and the planetary decelerating assembly along with a shaft sleeve is mounted on the middle shaft (16), the planetary decelerating assembly includes a third planetary disc and a turntable disc (9), a sun gear of the third planetary is concentric and mounted on middle shaft (16) along with a shaft sleeve, the turntable disc (9) has a single-row angular contact ball bearing corresponding to the position of planetary gear of the third planetary disc, the turntable disc (9) is mounted on a distal end of the middle shaft (16), the single-row angular contact ball bearing is coupled with the planetary gear of the third planetary disc by gear shaft (13).

2. The electric generator unit as claim 1, wherein:
the first planetary disc and the second planetary disc each has four planetary gears, and the third planetary disc has eight planetary gears.

3. The electric generator unit as claim 2, further comprising:
a shell;
an end of the shell along with shaft sleeve is mounted on the distal end of the middle shaft (16) and anther end of the shell along with shaft sleeve is mounted on a front end of the tail shaft (42), the front flywheel (55), the back flywheel (27), the gear accelerating assembly and the planetary decelerating assembly are mounted inside the shell.

4. The electric generator unit as claim 3, wherein:
the shell is provided with an oil inlet nozzle (17) and an oil return nozzle (6), the oil inlet nozzle (17) and the oil return nozzle (6) fluidly connect to an oil tank through an inlet line and an outlet line, respectively.

5. The electric generator unit as claim 4, further comprising:
a chassis assembly for securing the electric generator unit, the chassis assembly includes two laterally arranged upright chassis beams and a small beam, and each end of the small beam is fixed on a chassis beam, the electric generator unit is mounted on the chassis assembly.

6. The electric generator unit as claim 5, wherein:
the upright chassis beams are seamless steel tubes, an end of the seamless steel tubes are sealed, and another end of the seamless steel tubes are fluidly connected to the oil tank, the tube wall of seamless steel tubes are provided with openings, each of which is respectively connected with the inlet nozzle (17) and the oil return nozzle (6).

\* \* \* \* \*